US009674852B2

(12) United States Patent
Heo et al.

(10) Patent No.: US 9,674,852 B2
(45) Date of Patent: Jun. 6, 2017

(54) RADIO LINK FAILURE HANDLING FOR DUAL CONNECTIVITY

(71) Applicant: Intel IP Corporation, Santa Clara, CA (US)

(72) Inventors: Youn Hyoung Heo, Seoul (KR); Yujian Zhang, Beijing (CN)

(73) Assignee: Intel IP Corporation, Santa Clara, CA (US)

(*) Notice: Subject to any disclaimer, the term of this patent is extended or adjusted under 35 U.S.C. 154(b) by 22 days.

(21) Appl. No.: 14/491,639

(22) Filed: Sep. 19, 2014

(65) Prior Publication Data

US 2015/0117183 A1   Apr. 30, 2015

Related U.S. Application Data

(60) Provisional application No. 61/898,425, filed on Oct. 31, 2013.

(51) Int. Cl.
*H04W 24/04* (2009.01)
*H04W 72/10* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
CPC ..... H04W 48/12; H04W 4/003; H04W 24/10; H04W 28/0215; H04W 36/0055;
(Continued)

(56) References Cited

U.S. PATENT DOCUMENTS 9,118,452 B2 * 8/2015 Park .................. H04L 5/001
9,210,675 B2 * 12/2015 Dinan ............... H04W 56/0005
(Continued)

FOREIGN PATENT DOCUMENTS

CN   105379148 A   3/2016
CN   105556994 A   5/2016
(Continued)

OTHER PUBLICATIONS

"[Draft] LS on KeNB* generation in case of MFBI", R2-131153, 3GPP TSG RAN WG2 Meeting #80 bis, (May 24, 2013), 1 pg.
(Continued)

*Primary Examiner* — Brian O'Connor
(74) *Attorney, Agent, or Firm* — Schwegman Lundberg & Woessner, P.A.

(57) ABSTRACT

Embodiments of an evolved Node B (eNB) and methods for radio link failure handling for dual connectivity are generally described herein. A method performed by circuitry of a User Equipment (UE) may include connecting, at a UE, to a Master eNB (MeNB) and connecting to a Secondary eNB (SeNB). The method may include determining, at the UE, that one of the connections has a Radio Link Failure and determining at the UE, that the other of the connections remains connected to the UE. The method may include refraining from initiating a Radio Resource Control (RRC) re-establishment procedure while at least one of the connections does not have a radio link failure.

25 Claims, 5 Drawing Sheets

(51) Int. Cl.

| | | |
|---|---|---|
| *H04W 24/10* | (2009.01) | |
| *H04W 48/06* | (2009.01) | |
| *H04W 74/00* | (2009.01) | |
| *H04W 72/04* | (2009.01) | |
| *H04W 76/02* | (2009.01) | |
| *H04W 48/08* | (2009.01) | |
| *H04W 48/18* | (2009.01) | |
| *H04W 4/00* | (2009.01) | |
| *H04W 28/02* | (2009.01) | |
| *H04W 48/12* | (2009.01) | |
| *H04W 36/00* | (2009.01) | |
| *H04W 4/02* | (2009.01) | |
| *H04W 8/00* | (2009.01) | |
| *H04W 52/34* | (2009.01) | |
| *H04W 56/00* | (2009.01) | |
| *H04B 17/318* | (2015.01) | |
| *H04W 74/08* | (2009.01) | |
| *H04W 72/08* | (2009.01) | |
| *H04W 8/06* | (2009.01) | |
| *H04W 8/18* | (2009.01) | |
| *H04W 60/00* | (2009.01) | |
| *H04W 60/02* | (2009.01) | |
| *H04J 3/16* | (2006.01) | |
| *H04W 92/20* | (2009.01) | |
| *H04W 84/12* | (2009.01) | |
| *H04W 88/08* | (2009.01) | |
| *H04L 5/00* | (2006.01) | |
| *H04W 88/02* | (2009.01) | |
| *H04W 88/16* | (2009.01) | |
| *H04B 7/0413* | (2017.01) | |
| *H04W 8/04* | (2009.01) | |

(52) U.S. Cl.
CPC ........... *H04L 5/0007* (2013.01); *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01); *H04W 24/10* (2013.01); *H04W 28/0215* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(58) Field of Classification Search
CPC ... H04W 48/06; H04W 48/18; H04W 72/048; H04W 72/0486; H04W 74/004; H04W 76/023; H04W 76/025; H04W 76/027; H04W 84/12; H04W 88/08; H04W 92/20; H04W 72/10; H04W 8/06; H04W 4/023; H04W 76/028; H04W 76/02; H04W 60/00; H04W 8/183; H04W 60/02; H04W 72/085; H04W 4/008; H04W 56/001; H04W 74/0833; H04W 72/0453; H04L 5/0032; H04L 5/0007; H04J 3/1694; H04B 17/318

See application file for complete search history.

(56) References Cited

U.S. PATENT DOCUMENTS

| | | |
|---|---|---|
| 9,258,747 B2 | 2/2016 | Sivanesan et al. |
| 9,374,151 B2 | 6/2016 | Xiong et al. |
| 2003/0013443 A1 | 1/2003 | Willars et al. |
| 2007/0291733 A1 | 12/2007 | Doran et al. |
| 2008/0080428 A1 | 4/2008 | Jappila et al. |
| 2008/0205379 A1 | 8/2008 | Naqvi |
| 2009/0016249 A1 | 1/2009 | Li et al. |
| 2009/0270098 A1 | 10/2009 | Gallagher et al. |
| 2011/0080825 A1 | 4/2011 | Dimou et al. |
| 2011/0164562 A1 | 7/2011 | Qiu et al. |
| 2011/0280212 A1 | 11/2011 | Lv |
| 2012/0020291 A1 | 1/2012 | Nasielski et al. |
| 2012/0063298 A1 | 3/2012 | Yi et al. |
| 2012/0088498 A1 | 4/2012 | Xiao et al. |
| 2012/0202557 A1 | 8/2012 | Olofsson et al. |
| 2012/0218970 A1 | 8/2012 | Westberg et al. |
| 2012/0236776 A1 | 9/2012 | Zhang et al. |
| 2012/0276897 A1 | 11/2012 | Kwon et al. |
| 2012/0327821 A1 | 12/2012 | Lin et al. |
| 2012/0327894 A1 | 12/2012 | Axmon et al. |
| 2013/0022023 A1 | 1/2013 | Aydin |
| 2013/0023269 A1 | 1/2013 | Wang et al. |
| 2013/0044690 A1 | 2/2013 | Shaheen |
| 2013/0051507 A1 | 2/2013 | Jantunen et al. |
| 2013/0109301 A1 | 5/2013 | Hakola et al. |
| 2013/0121249 A1 | 5/2013 | Ji et al. |
| 2013/0183963 A1 | 7/2013 | Turtinen et al. |
| 2013/0183974 A1 | 7/2013 | Johansson et al. |
| 2013/0332559 A1 | 12/2013 | Mas Ivars et al. |
| 2014/0148174 A1 | 5/2014 | Teyeb et al. |
| 2014/0301305 A1 | 10/2014 | Xu et al. |
| 2015/0043420 A1 | 2/2015 | Xiong et al. |
| 2015/0049707 A1* | 2/2015 | Vajapeyam ........... H04W 24/10 370/329 |
| 2015/0078335 A1 | 3/2015 | Sivanesan et al. |
| 2015/0195750 A1 | 7/2015 | Sivanesan et al. |
| 2015/0195865 A1* | 7/2015 | Lee .................... H04W 36/0061 455/426.1 |
| 2015/0207672 A1 | 7/2015 | Xu et al. |
| 2015/0223258 A1* | 8/2015 | Jung .................... H04W 48/12 455/452.1 |
| 2015/0263836 A1* | 9/2015 | Kim ...................... H04B 7/024 370/329 |
| 2015/0327162 A1* | 11/2015 | Lee ...................... H04W 24/08 370/252 |
| 2015/0373609 A1* | 12/2015 | Kim ...................... H04W 16/24 370/332 |
| 2016/0044567 A1* | 2/2016 | Baghel ................ H04W 28/08 370/331 |
| 2016/0219541 A1 | 7/2016 | Chatterjee et al. |
| 2016/0227580 A1 | 8/2016 | Xiong et al. |
| 2016/0234847 A1 | 8/2016 | Zhang et al. |
| 2016/0242128 A1* | 8/2016 | Loehr ................ H04W 52/365 |
| 2016/0249259 A1* | 8/2016 | Park ..................... H04W 36/00 |
| 2016/0255602 A1 | 9/2016 | Zaus |
| 2016/0255615 A1 | 9/2016 | Chatterjee et al. |
| 2016/0255640 A1 | 9/2016 | Zitzmann et al. |

FOREIGN PATENT DOCUMENTS

| | | |
|---|---|---|
| CN | 105557051 A | 5/2016 |
| CN | 105557052 A | 5/2016 |
| CN | 105594140 A | 5/2016 |
| CN | 105594266 A | 5/2016 |
| CN | 105612786 A | 5/2016 |
| EP | 3031147 A1 | 6/2016 |
| EP | 3047679 A1 | 7/2016 |

(56) References Cited

FOREIGN PATENT DOCUMENTS

| EP | 3063883 A1 | 9/2016 |
|---|---|---|
| EP | 3063982 A1 | 9/2016 |
| EP | 3064012 A1 | 9/2016 |
| KR | 1020090124788 A | 12/2009 |
| KR | 1020110038571 A | 4/2011 |
| KR | 1020160039235 A | 4/2016 |
| WO | WO-2012150815 A2 | 11/2012 |
| WO | WO-2012159270 A1 | 11/2012 |
| WO | WO-201310808 A1 | 7/2013 |
| WO | WO-2013104413 A1 | 7/2013 |
| WO | WO-2015021320 A1 | 2/2015 |
| WO | WO-2015042100 A1 | 3/2015 |
| WO | WO-2015065619 A1 | 5/2015 |
| WO | WO-2015065768 A1 | 5/2015 |
| WO | WO-2015065881 A1 | 5/2015 |
| WO | WO-2015065947 A1 | 5/2015 |
| WO | WO-2015066281 A1 | 5/2015 |
| WO | WO-2015066476 A1 | 5/2015 |

OTHER PUBLICATIONS

"U.S. Appl. No. 14/279,562, Notice of Allowance mailed Sep. 4, 2015", 9 pgs, Sep. 4, 2015.
"U.S. Appl. No. 14/311,938, Non Final Office Action mailed Nov. 2, 2015", 14 pgs, Nov. 2, 2015.
"U.S. Appl. No. 14/659,655, Preliminary Amendment filed Mar. 18, 2015", 47 pgs, Mar. 18, 2015.
"Comparison of the UP Alternatives", R2-132338, 3GPP TSG-RAN WG2 Meeting #83, Barcelona, Spain, NSN, Nokia Corporation, NTT Docomo, Inc., Samsung, (Aug. 2013), 5 pgs.
"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.
"Discussion on Multi-level Prach Coverage Enhancement", R1-140616 3GPP TSG RAN WG1 Meeting #76 NTT Docomo, (Feb. 2014), 1-6.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA): Physical channels and modulation", 3GPP TS 36.211 version 9.1.0 Release 9 LTE, (Apr. 2010), 87 pgs.
"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.
"Evolved Universal Terrestrial Radio Access (E-UTRA); Radio Resource Control (RRC); Protocol specification", 3GPP TS 36.331 version 8.6.0 Release 8 ETSI, (Jul. 2009), 211 pgs.
"Further considerations on MTC coverage enhancement", Motorola Mobility, RI-132467, 3GPP TSG RAN WG1 Meeting #73, Fukuoka, Japan, (May 20-24, 2013), 1-3.
"Further discussion on resource allocation for D2D discovery", R1-134116 3GPP TSG RAN WG1 Meeting #74bis CATT, (Oct. 11, 2013), 1-6.
"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.
"Inter-corresponding sets of resources for D2D discovery", R1-134365 3GPP TSG RAN WG1 Meeting #74bis HTC, (Oct. 11, 2013), 1-2.
"International Application Serial No. PCT/US2014/050214, International Search Report mailed Nov. 19, 2014", 4 pgs.
"International Application Serial No. PCT/US2014/050214, Written Opinion mailed Nov. 19, 2014", 5 pgs.
"International Application Serial No. PCT/US2014/056003, International Search Report mailed Dec. 16, 2014", 4 pgs.
"International Application Serial No. PCT/US2014/056003, Written Opinion mailed Dec. 16, 2014", 5 pgs.
"International Application Serial No. PCT/US2014/056909, International Search Report mailed Dec. 26, 2014", 3 pgs.
"International Application Serial No. PCT/US2014/056909, Written Opinion mailed Dec. 26, 2014", 4 pgs.
"International Application Serial No. PCT/US2014/061569, International Search Report mailed Jan. 16, 2015", 3 pgs.
"International Application Serial No. PCT/US2014/061569, Written Opinion mailed Jan. 16, 2015", 6 pgs.
"International Application Serial No. PCT/US2014/062349, International Search Report mailed Jan. 26, 2015", 4 pgs.
"International Application Serial No. PCT/US2014/062349, Written Opinion mailed Jan. 26, 2015", 8 pgs.
"International Application Serial No. PCT/US2014/062533, International Search Report mailed Jan. 21, 2015", 3 pgs.
"International Application Serial No. PCT/US2014/062533, Written Opinion mailed Jan. 21, 2015", 6 pgs.
"International Application Serial No. PCT/US2014/063080, International Search Report mailed Feb. 12, 2015", 4 pgs.
"International Application Serial No. PCT/US2014/063080, Written Opinion mailed Feb. 12, 2015", 5 pgs.
"International Application Serial No. PCT/US2014/063434, International Search Report mailed Feb. 16, 2015", 4 pgs.
"International Application Serial No. PCT/US2014/063434, Written Opinion mailed Feb. 16, 2015", 8 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On MFBI and EARFCN extension", GP-130431 3GPP TSG Geran#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WGI_RL1/TSGRI_72b/Docs/R1-131397 .zip>, (Apr. 15-19, 2013).
"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WGI_RL1/TSGRI_73/Docs/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WGI_RLI/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 11)", 3GPP TS 29.018, V11.6.0, (Mar. 2013), 62 pgs.
"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.
"3rd Generation Partnership Project; Technical Specification Group Core Network and Terminals; Non-Access-Stratum (NAS) protocol

(56) References Cited

OTHER PUBLICATIONS for Evolved Packet System (EPS); Stage 3 (Release 11)", 3GPP TS 24.301, V11.8.0, (Sep. 2013), 345 pgs.
"U.S. Appl. No. 13/659,655, Response filed Jul. 14, 2016 to Final Office Action mailed May 20, 2016", 17 pgs.
"U.S. Appl. No. 14/311,938, Examiner Interview Summary mailed Jan. 22, 2016", 3 pgs.
"U.S. Appl. No. 14/311,938, Notice of Allowance mailed Feb. 29, 2016", 5 pgs.
"U.S. Appl. No. 14/311,938, Response filed Jan. 18, 2016 to Non Final Office Action mailed Nov. 2, 2015", 7 pgs.
"U.S. Appl. No. 14/659,655, Final Office Action mailed May 20, 2016", 10 pgs.
"U.S. Appl. No. 14/659,655, Non Final Office Action mailed Jan. 21, 2016", 10 pgs.
"U.S. Appl. No. 14/659,655, Notice of Allowance mailed Aug. 3, 2016", 8 pgs.
"U.S. Appl. No. 15/186,832, Preliminary Amendment filed Aug. 17, 2016", 8 pgs.
"U.S. Appl. No. 14/659,655, Response filed Apr. 20, 2016 to Non Final Office Action mailed Jan. 21, 2016", 31 pgs.
"Indian Application Serial No. 201647004844, Voluntary Amendment mailed Aug. 3, 2016", W/English Translation, 14 pgs.
"International Application Serial No. PCT/US2014/050214, International Preliminary Report on Patentability mailed Feb. 18, 2016", 7 pgs.
"International Application Serial No. PCT/US2014/056003, International Preliminary Report on Patentability mailed Mar. 31, 2016", 7 pgs.
"International Application Serial No. PCT/US2014/056909, International Preliminary Report on Patentability mailed May 12, 2016", 6 pgs.
"International Application Serial No. PCT/US2014/061569, International Preliminary Report on Patentability mailed May 12, 2016", 8 pgs.
"International Application Serial No. PCT/US2014/062349, International Preliminary Report on Patentability mailed May 12, 2016", 10 pgs.
"International Application Serial No. PCT/US2014/062533, International Preliminary Report on Patentability mailed May 12, 2016", 8 pgs.
"International Application Serial No. PCT/US2014/063080, International Preliminary Report on Patentability mailed May 12, 2016", 7 pgs.
"International Application Serial No. PCT/US2014/063434, International Preliminary Report on Patentability mailed May 12, 2016", 10 pgs.
U.S. Appl. No. 14/311,938, filed Jun. 23, 2014, Coverage Extension Level for Coverage Limited Device.
U.S. Appl. No. 15/186,832, filed Jun. 20, 2016, Coverage Extension Level for Coverage Limited Device.
U.S. Appl. No. 14/279,562, filed May 16, 2014, User Equipment and Methods for Fast Handover Failure Recovery in 3GPP LTE Network.
U.S. Appl. No. 14/659,655, filed Mar. 17, 2015, User Equipment, Port Control Protocol Server, and Methods for Signaling Device and Application Feedback (As Amended).
U.S. Appl. No. 15/026,174, filed Mar. 30, 2016, Signaling for Inter-Cell D2D Discovery in an LTE Network.
U.S. Appl. No. 14/916,843, filed Mar. 4, 2016, User Equipment and Mobility Management Entity and Methods for Periodic Update in Cellular Networks.
U.S. Appl. No. 14/917,451, filed Mar. 8, 2016, User Equipment and Evolved Node-B and Methods for Operation in a Coverage Enhancement Mode.
U.S. Appl. No. 15/026,753, filed Apr. 1, 2016, Resource Allocation for D2D Discovery in an LTE Network.
U.S. Appl. No. 15/026,788, filed Apr. 1, 2016, Signaling Extended EARFCN and E-UTRA Bands in UMTS Networks.
U.S. Appl. No. 14/917,154, filed Mar. 7, 2016, User Equipment and Methods of Bearer Operation for Carrier Aggregation.
"European Application Serial No. 14834710.7, Extended European Search Report mailedMar. 22, 2017", 9 pgs.
"European Application Serial No. 14858430.3, Extended European Search Report mailed Mar. 7, 2017", 9 pgs.
"European Application Serial No. 14858666.2, Extended European Search Report mailed Mar. 7, 2017", 8 pgs.
"European Application Serial No. 14858860.1, Extended European Search Report mailed Mar. 28, 2017", 9 pgs.
"European Application Serial No. 14859145.6, Extended European Search Report mailed Mar. 22, 2017", 8 pgs.
Huawei, et al., "DRB configuration and switch in dual Connectivity", 3GPP Draft; R2-142062, 3rd Generation Partnership Project (3GPP), Mobile Competence Centre; 650, Route Des Lucioles; F-06921 Sophia-Antipolis Cedex; France, vol. RAN WG2, No. Seoul, South Korea; 20140519-20140523, [Online] retrieved from the internet: <http://www.3gpp.org/ftp/tsg_ran/WG2_RL2/TSGR2_86/Docs/>, (May 10, 2014), 5 pgs.
Rapportuer, "Introduction of Dual Connectivity (RAN3 topics)", 3GPP Draft; R3-141480-DC-Stage2-01, 3rd Generation Partnership Project (3GPP), Mobile Competence Centre; 650, Route Des Lucioles; F-06921 Sophia-Antipolis Cedex; France, vol. RAN WG3, No. Seoul, South Korea; 20140519-20140523, [Online] retrieved from the internet:<:http://www.3gpp.org/ftp/tsg_ran/WG3_lu/TSGR3_84/Docs/>, (May 24, 2014), 62 pgs.

* cited by examiner

US 9,674,852 B2

RADIO LINK FAILURE HANDLING FOR DUAL CONNECTIVITY

CLAIM OF PRIORITY

This patent application claims the benefit of priority of U.S. Provisional Patent Application Ser. No. 61/898,425, entitled "Advanced Wireless Communication Systems and Techniques," filed on Oct. 31, 2013, which is hereby incorporated by reference herein in its entirety.

BACKGROUND

Improvement in cell throughput in heterogeneous deployment scenarios is currently being made through the use of dual connectivity. In dual connectivity, a User Equipment (UE) is served by serving cells corresponding to more than one evolved Node B (eNB). Dual connectivity is also referred to as inter-eNB carrier aggregation or inter-node resource aggregation. In dual connectivity, the UE is connected to a primary cell (PCell) in a Master eNB (MeNB) and a secondary cell (SCell) in a Secondary eNB (SeNB). A number of approaches have been made to utilize dual connectivity, but each of these approaches has lacked a way to handle a situation where a radio link failure occurs in one of the eNBs but not the other.

Figure 1:
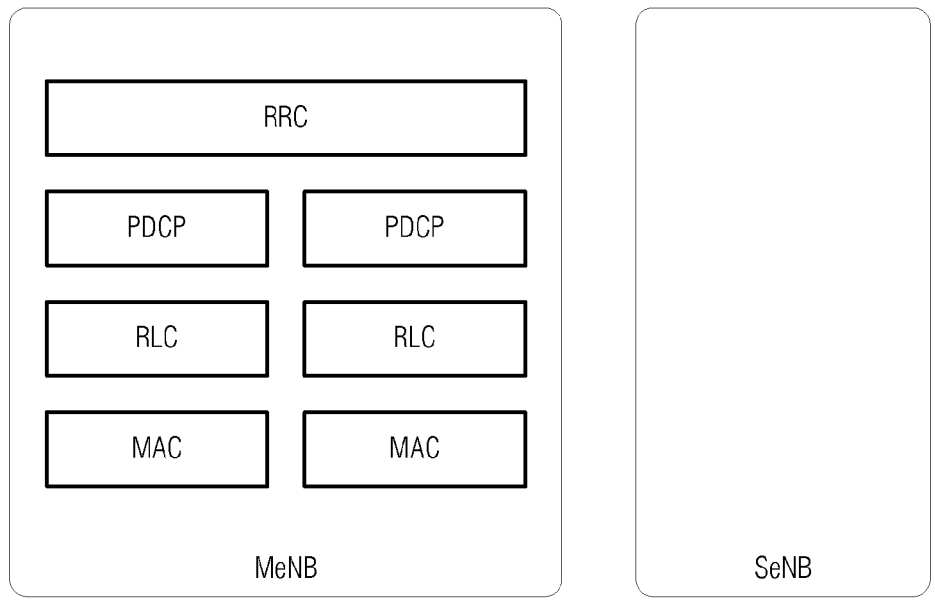
FIG. 1 illustrates generally a diagram showing a system 100 with a Master evolved Node B (MeNB) supporting radio bearers in accordance with some embodiments.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Techniques to handle a radio link failure in dual connectivity settings are desired. Dual connectivity may refer to systems and methods where a User Equipment (UE) is served by serving cells corresponding to more than one evolved Node B (eNB). In an example, a Master eNB (MeNB) and a Secondary eNB (SeNB) may serve a UE. The MeNB may include a primary cell (PCell) and the SeNB may include a secondary cell (SCell). In an example, for user plane architecture, the UE may be connected to the SeNB directly or indirectly through the MeNB. In another example, a radio bearer, such as a signaling radio bearer (SRB) or a data radio bearer (DRB), may be split between the MeNB and the SeNB. SRBs may include Signaling Radio Bearer 0 (SRB0), Signaling Radio Bearer 1 (SRB1), Signaling Radio Bearer 2 (SRB2), or the like, such as may be found in a technical specification similar to the 3GPP Technical Specification (TS) 36.331 "Evolved Universal Terrestrial Radio Access (E-UTRA); Radio Resource Control (RRC) Protocol specification", (e.g., release version 11 or later), such as at 4.2.2 "RRC connection re-establishment".

FIG. 1 illustrates generally a diagram showing a system 100 with a MeNB supporting radio bearers in accordance with some embodiments. In an example, the system 100 uses a MeNB and an SeNB without a bearer split. For example, the MeNB in system 100 may transmit a radio resource control (RRC) message to a UE but the SeNB may not transmit a RRC message. The MeNB may communicate directly with the UE and the SeNB. The SeNB may communicate to the UE indirectly through the MeNB. The SeNB may not have SRBs set up to communicate with the UE and may use a DRB to communicate with the MeNB.

Figure 2:
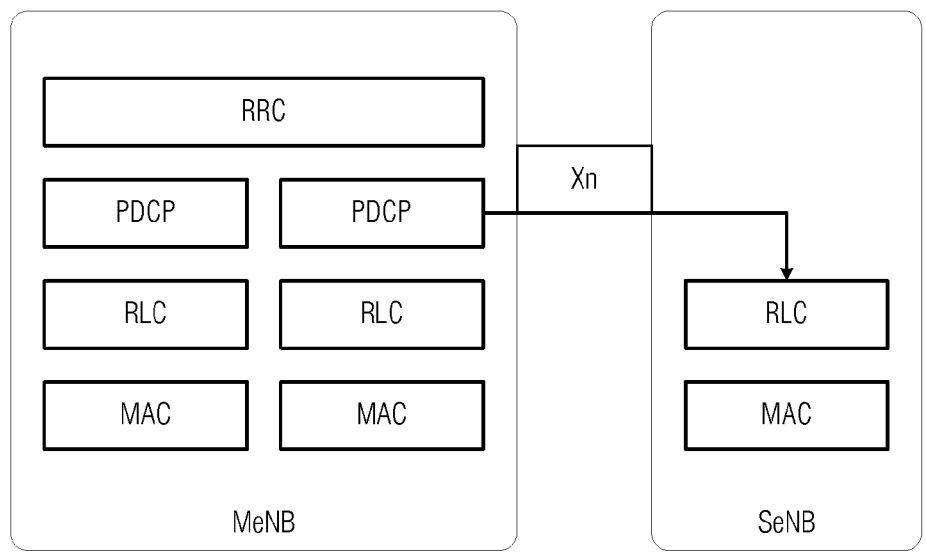
FIG. 2 illustrates generally a diagram showing a system 200 showing a radio bearer split using a MeNB and a Secondary evolved Node B (SeNB) in accordance with some embodiments.

FIG. 2 illustrates generally a diagram showing a system 200 showing a radio bearer split using a MeNB and a SeNB in accordance with some embodiments. In an example, data may be forwarded by the MeNB using an Xn interface and a radio bearer may be split between the MeNB and the SeNB above a radio link control (RLC) layer. Other radio bearers may be configured to be used by the MeNB or the SeNB (i.e., not split). If a radio bearer is split, a PDCP PDU of the radio bearer may be transferred to the SeNB by the MeNB using the Xn interface. In an example, using the system 200, a RRC message may be transmitted by the MeNB or the SeNB.

FIGS. 1 and 2 illustrate generally, diagrams that show systems that may be used to implement part or all of any of the embodiments described below.

Figure 3A:
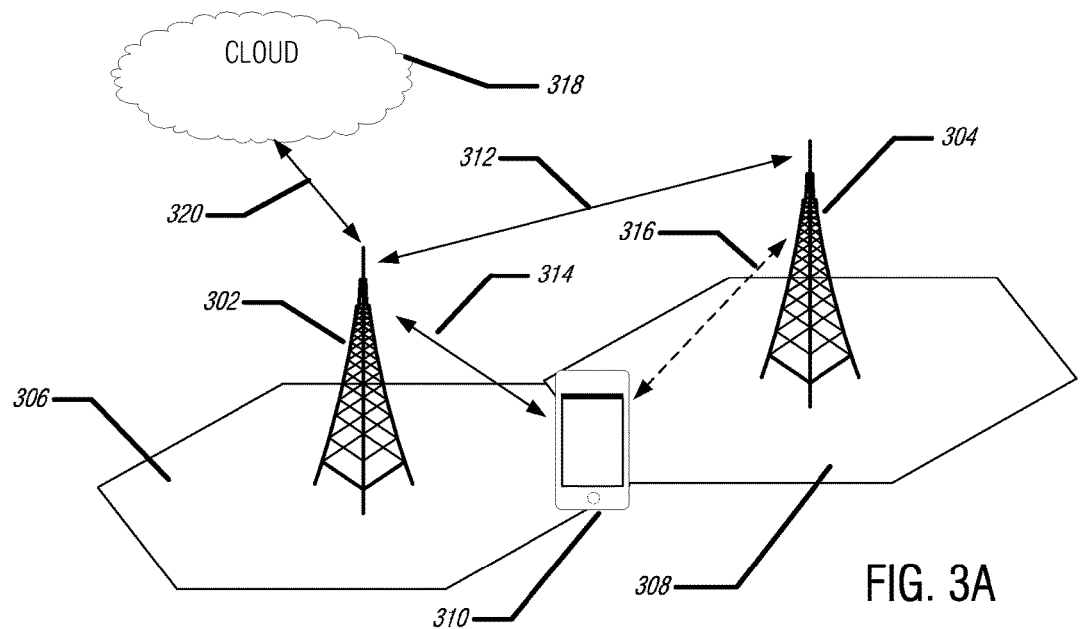
FIGS. 3A, 3B, and 3C illustrate generally diagrams showing a Wireless Network with a UE operating in a dual connectivity mode in accordance with some embodiments.
Figure 3B:
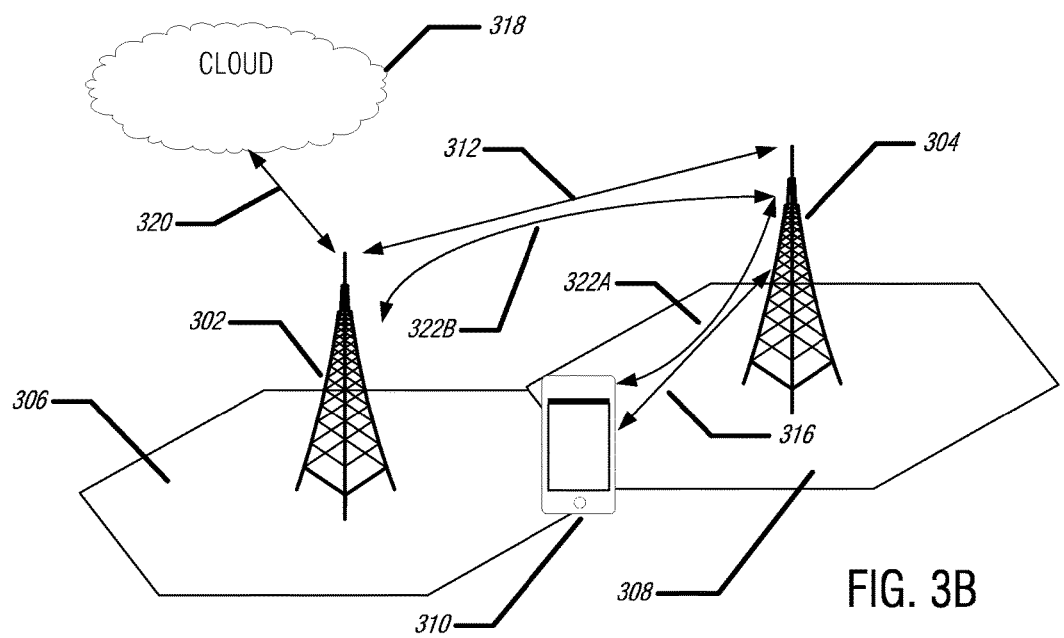
Figure 3C:
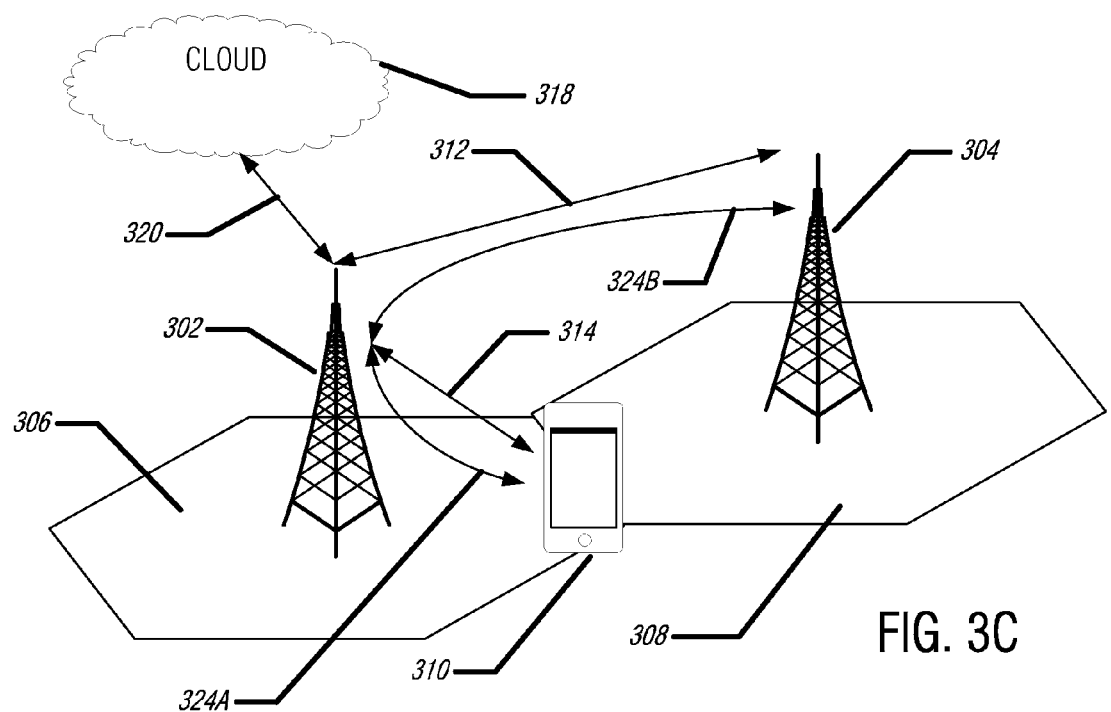

FIGS. 3A, 3B, and 3C illustrate generally diagrams showing a Wireless Network with a UE operating in a dual connectivity mode in accordance with some embodiments. In an example, a Wireless Network may operate as a 3rd Generation Partnership Project (3GPP) long term evolution (LTE) or LTE-advanced network. For example, FIGS. 3A, 3B, and 3C may represent the interoperation of eNBs and UEs in an LTE network. In an example, a MeNB 302 may connect with a UE 310 over a connection to the MeNB 314 when the UE 310 is in range of a PCell 306 served by the MeNB 302. The UE 310 may use the connection to the MeNB 314 with the MeNB 302 to connect with the cloud 318 using a cloud connection 320. In a dual connectivity mode, when the UE 310 is also in range of a SCell 308, the UE 310 may use a SeNB 304 to connect to the internet or the cloud 318.

In an example, the UE 310 may communicate with the cloud 318 using the SeNB 304 directly over a secondary connection 316. In another example, the UE 310 may communicate with the cloud 318 using the SCell 308 and the SeNB 304 indirectly over a eNB-to-eNB connection 312 and the cloud connection 320, such as by directly communicating with the SeNB 304 over the secondary connection 316. The UE 310 may connect with the SeNB 304 over the secondary connection 316 when in range of the SCell 308, the SeNB 304 may connect with the MeNB over the eNB-to-eNB connection 312, and the MeNB may connect with the cloud 318 over the cloud connection 320. In this example, the UE 310 may communicate with the cloud 318 by sending and receiving data over the various connections.

In an example, the UE 310 may detect a radio link failure on the MeNB 302 or the SeNB 304. If no radio link failure is detected by the UE 310 on the MeNB 302 or the SeNB 304, the UE may function in dual connectivity, such as in FIG. 3A. If the UE 310 detects a radio link failure on both the MeNB 302 and the SeNB 304, the UE 310 may initiate an RRC connection establishment procedure. For example, the UE 310 may initiate a procedure from a technical specification similar to the 3GPP Technical Specification (TS) 36.331 "Evolved Universal Terrestrial Radio Access (E-UTRA); Radio Resource Control (RRC) Protocol specification", (e.g., release version 11 or later), such as at 5.3.7 "RRC connection re-establishment". In an example, the UE 310 may identify a radio link failure if a timer expires. For example, the timer may be timer T310 from a technical specification similar to TS 36.331 described above, such as at 5.5.4.2 "T310 expiry". In another example, the UE 310 may identify a radio link failure if a random access problem indication is sent from the MAC. The UE 310 may identify a radio link failure from a random access problem indication sent from the MAC if specified timers are not running. For example, the timers may be timers T300, T301, T304, or T311 from a technical specification similar to TS 36.331 described above. In another example, the UE 310 may identify a radio link failure if an indication is received from the RLC that a number of retransmissions has exceeded a threshold.

In an example, the UE 310 may detect a radio link failure with the MeNB 302 and not on the SeNB 304, such as in FIG. 3B, where the connection to the MeNB 314 of FIG. 3A fails. The UE 310 may transmit a RRC signal indicating a radio link failure with the MeNB 302 using the secondary connection 316 with the SeNB 304. The SeNB 304 may then send the RRC signal to the MeNB 302 over the eNB-to-eNB connection 312. In an example, two logical channels may be configured for a specified SRB, with one logical channel for the specified SRB served by the MeNB 302 and the other logical channel for the specified SRB served by the SeNB 304. The UE 310 may send an indication of the radio link failure on the MeNB 302 by using a logical channel served by the SeNB 304. In another example, there may be one logical channel for a particular SRB, and the logical channel may be served by the MeNB 302. In this example, the SeNB and the MeNB may communicate over the eNB-to-eNB connection 312 using a DRB, such as a DRB dedicated to eNB-to-eNB communication. The UE 310 may prevent initiation of, or refrain from initiating, a RRC re-establishment procedure while the SeNB 304 is connected and does not have a radio link failure. In an example, after the UE 310 detects a radio link failure on the MeNB 302, a timer, such as the T310 timer may be stopped, if it is running. After the UE 310 detects a radio link failure on the MeNB 302, all radio bearers except SRB0 and any DRBs mapped to SeNB 304 may be suspended. After the UE 310 detects a radio link failure on the MeNB 302, the MAC may be reset. After the UE 310 detects a radio link failure on the MeNB 302, a default physical channel configuration may be applied, such as the configuration from a technical specification similar to TS 36.331 described above, at 9.2.4 "Default physical channel configuration". After the UE 310 detects a radio link failure on the MeNB 302, a default semi-persistent scheduling configuration may be applied, such as the configuration from a technical specification similar to TS 36.331 described above, at 9.2.3 "Default semi-persistent scheduling configuration". After the UE 310 detects a radio link failure on the MeNB 302, a default MAC main configuration may be applied, such as the configuration from a technical specification similar to TS 36.311 described above, at 9.2.2 "Default MAC main configuration.

In an example, after the UE 310 detects a radio link failure on the MeNB 302, the MeNB may send a request over the eNB-to-eNB connection 312 to the SeNB 304 to reconfigure. The SeNB 304 may reconfigure all SRBs, except the SRB0, and all DRBs to be connected to the SeNB 304 and continue data operation with the UE 310. The SeNB 304 may provide reconfigured radio resource information to the MeNB 302, and then the MeNB 302 may send a RRC connection reconfiguration message through the SeNB 304 to the UE 310 using the relay connections 322A and 322B. In another example, the MeNB 302 may perform a handover procedure to the SeNB 304. The MeNB 302 may send a handover command message over the SeNB 304 to the UE 310 using the relay connections 322A and 322B.

In an example, when the UE 310 detects a radio link failure with the MeNB 302, UE context may be retained by the MeNB 302. The MeNB 302 may continue to maintain the UE context management for the SeNB 304 and the UE 310, and the SeNB 304 may continue to relay information from the UE 310 to the MeNB 302. An example of the data flow from the UE 310 to the MeNB 302 may be seen in FIG. 3B, such as using relay connection 322A to send and receive data with the UE 310 and the SeNB 304 and relay connection 322B to send and receive data with the SeNB 304 and the MeNB 302. Data may sent and received using relay connections 322A and 322B, may also be sent and received with the cloud 318 and the MeNB 302 using the cloud connection 320. The connection to the MeNB 314 between the UE 310 and the MeNB 302 from FIG. 3A is temporarily or permanently unusable in FIG. 3B, but the UE 310 may still send and receive data with the MeNB 302 using the relay connections 322A and 322B as described above. The connection to the MeNB 314 may be temporarily unusable if the UE 310 is not in range of the PCell 306. The UE 310 may later be in range of the PCell 306 or another cell in the MeNB 302. If the MeNB 302 channel condition with the UE 310 improves, the connection to the MeNB 314 may resume. In an example, the connection to the MeNB 314 may resume when the connection improves, such as using a Radio Resource Management (RRM) measurement. For example, if conditions relating to connection between the UE 310 and the PCell 306 exceed a threshold, the connection to the MeNB 314 may resume. In another example, the UE 310 may monitor the PCell 306, such as by using radio link monitoring and may recover from the radio link failure if the UE RRC receives an in-sync indication in a subframe, or if the UE RRC receives in-sync indications in more than one consecutive subframe. If the UE 310 monitors the PCell 306 and the PCell 306 channel quality remains poor for longer than a specified duration, the MeNB 302 may initiate a handover procedure from the PCell 306. The handover procedure may include a handover procedure from the PCell 306 to the SCell 308 in the SeNB 304, to another cell in the SeNB 304, or to another cell not in the SeNB 304. A handover command message may be generated in RRC in the MeNB 302 and may be sent over the eNB-to-eNB connection 312 to the SeNB 304. The handover command message may be sent to the UE 310 using the secondary connection 316. The path the handover command message may take may also be represented by relay connections 322A and 322B.

In an example, the UE 310 may detect a radio link failure on the SeNB 304 and not on the MeNB 302, such as in FIG. 3C where the secondary connection 316 of FIG. 3A fails. The UE 310 may transmit a RRC signal indicating a radio link failure with the SeNB 304 using the connection to the MeNB 314, such as by using a logical channel served by the MeNB. The UE 310 may prevent initiation of, or refrain from initiating, a RRC re-establishment procedure while the MeNB 302 is connected and does not have a radio link failure. In an example, after the UE 310 detects a radio link failure on the SeNB 304, a timer, such as the T310 timer may be stopped, if it is running. After the UE 310 detects a radio link failure on the SeNB 304, all radio bearers except radio bearers mapped to MeNB 302 may be suspended. After the UE 310 detects a radio link failure on the SeNB 304, the MAC may be reset. After the UE 310 detects a radio link failure on the SeNB 304, a default physical channel configuration may be applied, such as the configuration from a technical specification similar to TS 36.331 described above, at 9.2.4 "Default physical channel configuration". After the UE 310 detects a radio link failure on the SeNB 304, a default semi-persistent scheduling configuration may be applied, such as the configuration from a technical specification similar to TS 36.331 described above, at 9.2.3 "Default semi-persistent scheduling configuration". After the UE 310 detects a radio link failure on the SeNB 304, a default MAC main configuration may be applied, such as the configuration from a technical specification similar to TS 36.311 described above, at 9.2.2 "Default MAC main configuration.

In an example, the MeNB 302 may send a request to the SeNB 304 to release serving cells mapped to the SeNB 304, such as the SCell 308. The SeNB 304 may later be added in a dual connection with the MeNB 302 if the channel situation in the SeNB 304 improves. In another example, the SeNB 304 release or addition may not involve additional signaling to the core network (e.g., the cloud 318). In an example, the MeNB 302 may send a RRC connection reconfiguration message to the UE 310 over the connection to the MeNB 314 to remove the SCell 308 (or any other secondary cells) mapped to the SeNB. The RRC connection reconfiguration message may also request the reconfiguration of radio bearers served by the SeNB 304.

A UE 310 may initialize a contention-based or a non-contention-based random access procedure to attempt to contact a network. In an example, the UE may use a contention-based random access procedure or a non-contention-based random access procedure for the PCell 306 or the SCell 308 in dual connectivity. A contention-based random access procedure is a random access procedure where the UE is sending a request that may collide with other UEs making other random access requests. A non-contention-based random access procedure differs in that the network may indicate a unique identifier for the UE's request, such that the request is less likely to collide with other UEs making other random access requests.

If a maximum number of preamble transmissions is reached in a random access procedure (contention-based or non-contention-based) when the UE 310 is in a non-dual connectivity environment, the UE 310 may indicate a random access problem to upper layers. When the UE 310 is in a dual connectivity environment, if the random access procedure fails in the MeNB 302 (e.g., a preamble transmission counter exceeds a threshold), the UE may indicate a random access problem to upper layers.

In an example, in order to notify the network or the upper layers that a random access procedure has failed in the SeNB 304, the UE 310 may indicate a random access problem to upper layers or send a random access problem indication to the MeNB 302, such as over a UE random access problem connection 324A. For example, the UE 310 may indicate a random access problem to upper layers if a contention-based random access procedure for the SeNB 304, such as on the SCell 308 corresponding to the SeNB 304, fails (e.g., a maximum number of attempts is reached or a threshold is exceeded, such as PREAMBLE_TRANSMISSION_COUNTER=preambleTransMax+1). In an example, the random access procedure for the SeNB 304 may be a non-contention-based random access procedure. The UE 310 may indicate a random access problem to upper layers, such as the RRC layer and the RRC may declare a radio link failure in the SCell 308 or the SeNB 304 based on the indication from the UE 310 of the random access problem. The MeNB 302 may transmit to the SeNB 304 information about the random access problem using an eNB random access problem connection 324B.

In another example, the UE 310 may send a random access problem indication to the MeNB 302 indicating that the random access procedure for the SeNB 304 has failed. For example, the UE 310 may indicate a random access problem to the MeNB 302 if a contention-based random access procedure for the SeNB 304, such as on the SCell 308 corresponding to the SeNB 304, fails (e.g., a maximum number of attempts is reached or a threshold is exceeded, such as PREAMBLE_TRANSMISSION_COUNTER=preambleTransMax+1). In an example, the random access procedure for the SeNB 304 may be a non-contention-based random access procedure. In an example, the UE 310 may indicate to the MeNB 302 that a random access procedure failure has occurred with the SeNB 304 using RRC signaling. In another example, the UE 310 may use a Medium Access Control (MAC) control element (MAC CE) to send an indication of a random access problem. The MeNB 302 may transmit to the SeNB 304 information about the random access problem using an eNB random access problem connection 324B. For example, one value in a logical channel identifier (LCID) may be used to represent the random access problem in the SeNB 304. In an example, the value may be an index value in the LCID for an upload scheduler (UL-SCH), such as a value of 11000, as shown in Table 1 below. For example, the value may be added to a technical specification similar to the 3GPP Technical Specification (TS) 36.321 "Evolved Universal Terrestrial Radio Access (E-UTRA); Medium Access Control (MAC) protocol specification", (e.g., release version 11 or later). For example, such a table may be provided in section 6.2.1 of TS 36.321. In addition to the values that are currently defined in the TS 36.321, for example, a new value may be defined for the random access problem in SeNB.

TABLE 1

Values of LCID for UL-SCH in LTE as can be added to section 6.2.1 of TS 36.321.

| Index | LCID Values |
|---|---|
| 00000 | CCCH |
| 00001-01010 | Identity of the logical channel |
| 01011-10111 | Reserved |
| 11000 | Random Access Problem in SeNB |
| 11001 | Extended Power Headroom Report |
| 11010 | Power Headroom Report |
| 11011 | C-RNTI |

TABLE 1-continued

Values of LCID for UL-SCH in LTE as can
be added to section 6.2.1 of TS 36.321.

| Index | LCID Values |
|---|---|
| 11100 | Truncated BSR |
| 11101 | Short BSR |
| 11110 | Long BSR |
| 11111 | Padding |

In an example, the MAC CE may have a fixed size of zero bytes. In another example, the MAC CE may have one or more bytes to indicate a radio link failure in the SeNB 304. For example, the LCID 11000 in Table 1 above may be used to represent a radio link problem in SeNB 304 MAC CE, and the byte may have a format, such as the format in FIG. 4.

Figure 4:
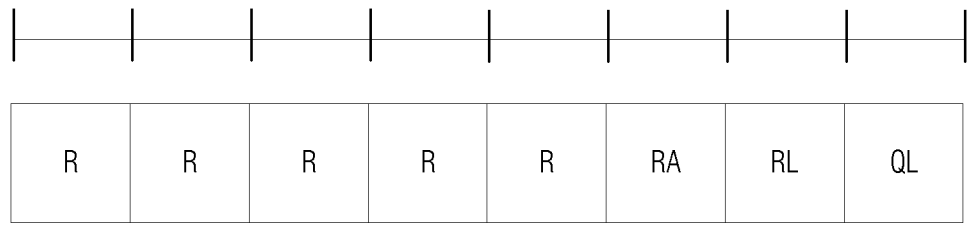
FIG. 4 illustrates generally a diagram showing a byte in a logical channel identifier (LCID) in accordance with some embodiments.

FIG. 4 illustrates generally a diagram showing a byte in a logical channel identifier (LCID) in accordance with some embodiments. In an example, in FIG. 4, "R" may represent a reserved bit, "RA" may represent a random access problem in SeNB, "RL" may indicate a RLC error in SeNB, or "QL" may indicate a radio link monitoring problem in SeNB. For example, if "RA" is set to one, that may indicate there is a random access problem in SeNB and if "RA" is set to zero, that may indicate there is not a random access problem in SeNB. For example, if "RL" is set to one, that may indicate there is a RLC error in SeNB and if "RL" is set to zero, that may indicate there is not a RLC error in SeNB. For example, if "QL" is set to one, that may indicate there is a radio link monitoring problem in SeNB and if "QL" is set to zero, that may indicate there is not a radio link monitoring problem in SeNB.

Figure 5:
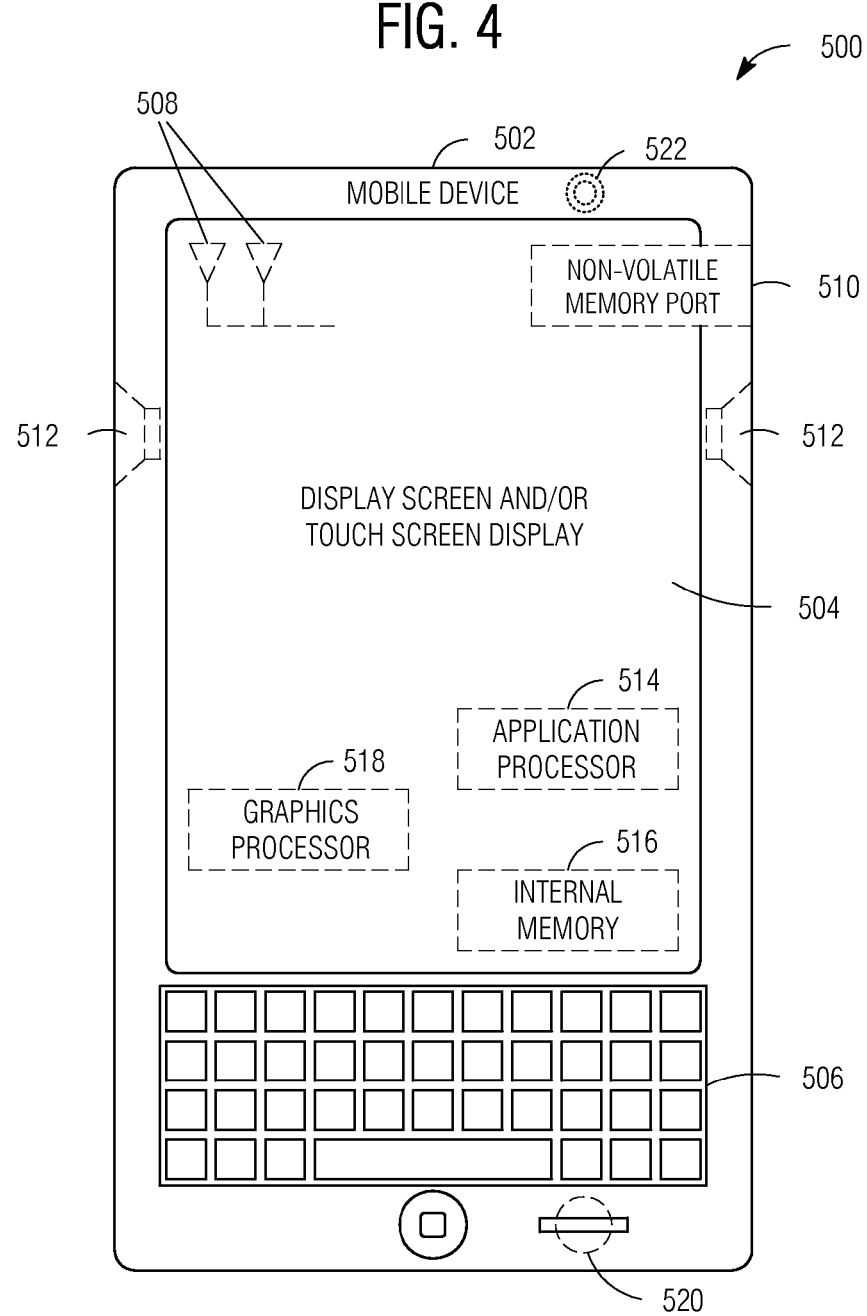
FIG. 5 illustrates generally a diagram showing a mobile client device on which the configurations and techniques described herein may be deployed in accordance with some embodiments.

FIG. 5 illustrates generally a diagram showing a mobile client device on which the configurations and techniques described herein may be deployed in accordance with some embodiments. FIG. 5 provides an example illustration of a mobile device 500, such as a user equipment (UE), a mobile station (MS), a mobile wireless device, a mobile communication device, a tablet, a handset, or other type of mobile wireless computing device. The mobile device 500 may include one or more antennas 508 within housing 502 that are configured to communicate with a hotspot, base station (BS), an eNB, or other type of WLAN or WWAN access point. The mobile device may be configured to communicate using multiple wireless communication standards, including standards selected from 3GPP LTE, WiMAX, High Speed Packet Access (HSPA), Bluetooth, and Wi-Fi standard definitions. The mobile device 500 may communicate using separate antennas for each wireless communication standard or shared antennas for multiple wireless communication standards. The mobile device 500 may communicate in a WLAN, a WPAN, and/or a WWAN.

FIG. 5 also provides an illustration of a microphone 520 and one or more speakers 512 that may be used for audio input and output from the mobile device 500. A display screen 504 may be a liquid crystal display (LCD) screen, or other type of display screen such as an organic light emitting diode (OLED) display. The display screen 504 may be configured as a touch screen. The touch screen may use capacitive, resistive, or another type of touch screen technology. An application processor 514 and a graphics processor 518 may be coupled to internal memory 516 to provide processing and display capabilities. A non-volatile memory port 510 may also be used to provide data input/output options to a user. The non-volatile memory port 510 may also be used to expand the memory capabilities of the mobile device 500. A keyboard 506 may be integrated with the mobile device 500 or wirelessly connected to the mobile device 500 to provide additional user input. A virtual keyboard may also be provided using the touch screen. A camera 522 located on the front (display screen) side or the rear side of the mobile device 500 may also be integrated into the housing 502 of the mobile device 500.

Figure 6:
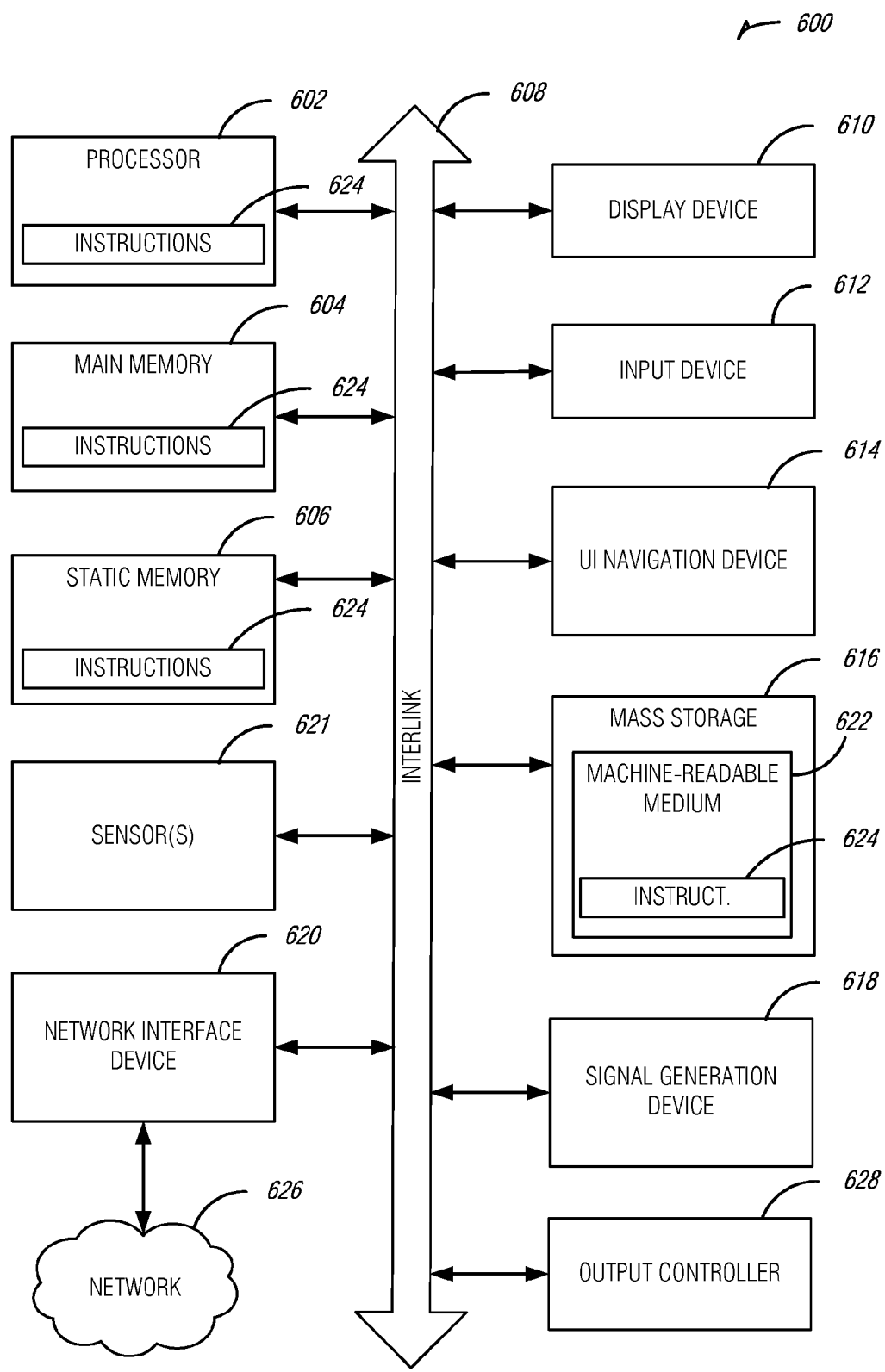
FIG. 6 illustrates generally an example of a block diagram of a machine 600 upon which any one or more of the techniques (e.g., methodologies) discussed herein can perform in accordance with some embodiments.

FIG. 6 illustrates generally an example of a block diagram of a machine 600 upon which any one or more of the techniques (e.g., methodologies) discussed herein can perform in accordance with some embodiments. In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 600 can include a hardware processor 602 (e.g., a central processing unit (CPU), a graphics processing unit (GPU), a hardware processor core, or any combination thereof), a main memory 604 and a static memory 606, some or all of which can communicate with each other via an interlink (e.g., bus) 608. The machine 600 can further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 can be a touch screen display. The machine 600 can additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 can include a machine readable medium 622 that is non-transitory on which is stored one or more sets of data structures or instructions 624 (e.g., software) embodying or utilized by any one or more of the techniques or functions described herein. The instructions 624 can also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 can constitute machine readable media.

While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Additional examples of the presently described method, system, and device embodiments are suggested according to the structures and techniques described herein. Other non-limiting examples can be configured to operate separately, or can be combined in any permutation or combination with any one or more of the other examples provided above or throughout the present disclosure.

Example 1 includes the subject matter embodied by a first evolved Node B (eNB), the first eNB connected to a User Equipment (UE), the eNB comprising: hardware processing circuitry arranged to: receive, from the UE, an indication of a Radio Link Failure at a second eNB, the UE in a dual connectivity state with the first eNB and the second eNB, communicate to the second eNB a command to suspend at least one radio bearer used by the second eNB.

In Example 2, the subject matter of Example 1 can optionally include wherein the first eNB is a Master eNB (MeNB) and the second eNB is a Secondary eNB (SeNB), and wherein the MeNB is associated with a Primary Cell (PCell) and the SeNB is associated with a Secondary Cell (SCell).

In Example 3, the subject matter of one or any combination of Examples 1-2 can optionally include wherein operations to suspend the at least one radio bearer used by the second eNB include operations to suspend all radio bearers used by SeNB.

In Example 4, the subject matter of one or any combination of Examples 1-3 can optionally include wherein the hardware processing circuitry of the MeNB is further arranged to transmit a Radio Resource Control reconfiguration message to the UE to remove the SCell from a set of cells serving the UE to suspend the at least one radio bearer.

In Example 5, the subject matter of one or any combination of Examples 1-4 can optionally include wherein the first eNB is a Secondary eNB (SeNB) and the second eNB is a Master eNB (MeNB), and wherein the MeNB is associated with a Primary Cell (PCell) and the SeNB is associated with a Secondary Cell (SCell).

In Example 6, the subject matter of one or any combination of Examples 1-5 can optionally include wherein operations to suspend the at least one radio bearer used by the second eNB include operations to suspend a Signaling Radio Bearer 1 (SRB1) and a Signaling Radio Bearer 2 (SRB2) used by the MeNB.

In Example 7, the subject matter of one or any combination of Examples 1-6 can optionally include wherein the hardware processing circuitry of the SeNB is further arranged to relay a Radio Resource Control reconfiguration message from the MeNB to the UE to suspend the at least one radio bearer.

In Example 8, the subject matter of one or any combination of Examples 1-7 can optionally include wherein the hardware processing circuitry of the SeNB is further arranged to receive instructions to initiate a handover from the MeNB to suspend the at least one radio bearer.

In Example 9, the subject matter of one or any combination of Examples 1-8 can optionally include wherein the hardware processing circuitry of the SeNB is further arranged to use a UE context for the UE, the UE context maintained by the MeNB.

In Example 10, the subject matter of one or any combination of Examples 1-9 can optionally include wherein the hardware processing circuitry of the SeNB is further arranged to receive the Radio Link Failure indication over a logical channel.

In Example 11, the subject matter of one or any combination of Examples 1-10 can optionally include wherein the MeNB is further arranged to receive an indication of a random access problem from the UE.

In Example 12, the subject matter of one or any combination of Examples 1-11 can optionally include wherein the indication is received by the MeNB using a Radio Resource Control (RRC) message.

In Example 13, the subject matter of one or any combination of Examples 1-12 can optionally include wherein the indication is received by the MeNB using a MAC control element.

In Example 14, the subject matter of one or any combination of Examples 1-13 can optionally include wherein the MAC control element has zero bytes.

In Example 15, the subject matter of one or any combination of Examples 1-14 can optionally include wherein the MAC control element includes information indicating: a random access problem in the SeNB, a radio link control error in the SeNB, or a radio link monitoring error in the SeNB.

Example 16 includes the subject matter embodied by User Equipment (UE) adapted for communication with an evolved Node B (eNB), the UE comprising: a transceiver arranged to transmit and receive communication with a Master eNB (MeNB) and a Secondary eNB (SeNB), and a processor, coupled to the transceiver, arranged to perform operations in connection with a connection to a MeNB and a connection to a SeNB: determine that one of a connection to the MeNB and a connection to the SeNB has a Radio Link Failure, determine that the other one of the connection to the MeNB and the connection to the SeNB does not have a Radio Link Failure, and prevent initiation of a Radio Resource Control (RRC) re-establishment procedure while the other one of the connection to the MeNB and the connection to the SeNB does not have a Radio Link Failure.

In Example 17, the subject matter of Example 16 can optionally include wherein the connection that has a Radio Link Failure is the MeNB and the connection that remains connected is the SeNB, and wherein the MeNB is associated with a Primary Cell (PCell) and the SeNB is associated with a Secondary Cell (SCell).

In Example 18, the subject matter of one or any combination of Examples 16-17 can optionally include wherein the UE is further arranged to receive a Radio Resource Control (RRC) reconfiguration message from the MeNB to remove the SCell.

In Example 19, the subject matter of one or any combination of Examples 16-18 can optionally include wherein the UE is further arranged to transmit a Radio Resource Control (RRC) message to the MeNB indicating that the SeNB has a Radio Link Failure.

In Example 20, the subject matter of one or any combination of Examples 16-19 can optionally include wherein the UE is further arranged to transmit the RRC message over a logical channel.

In Example 21, the subject matter of one or any combination of Examples 16-20 can optionally include wherein the connection that has a Radio Link Failure is the SeNB and the connection that remains connected is the MeNB, and wherein the MeNB is associated with a Primary Cell (PCell) and the SeNB is associated with a Secondary Cell (SCell).

In Example 22, the subject matter of one or any combination of Examples 16-21 can optionally include wherein the UE is further arranged to receive a Radio Resource Control reconfiguration message originating from the MeNB sent through the SeNB.

In Example 23, the subject matter of one or any combination of Examples 16-22 can optionally include wherein the UE is further arranged to receive a handover command message originating from the MeNB through the SeNB.

In Example 24, the subject matter of one or any combination of Examples 16-23 can optionally include wherein the UE is further arranged to receive a handover command message originating from the MeNB through a new cell, wherein the new cell is not the PCell or the SCell.

In Example 25, the subject matter of one or any combination of Examples 16-24 can optionally include wherein the UE is further arranged to use a UE context, the UE context maintained by the MeNB.

In Example 26, the subject matter of one or any combination of Examples 16-25 can optionally include wherein the UE is further arranged to reconnect to the MeNB when a MeNB channel condition exceeds a threshold.

In Example 27, the subject matter of one or any combination of Examples 16-26 can optionally include wherein the UE is further arranged to monitor the PCell after determining that the MeNB has a Radio Link Failure.

In Example 28, the subject matter of one or any combination of Examples 16-27 can optionally include wherein the UE is further arranged to transmit a radio resource control (RRC) message to the SeNB indicating that the MeNB has a Radio Link Failure.

In Example 29, the subject matter of one or any combination of Examples 16-28 can optionally include wherein the UE is further arranged to transmit the RRC message over a logical channel.

In Example 30, the subject matter of one or any combination of Examples 16-29 can optionally include wherein the UE is further arranged to indicate a Random Access problem to an upper layer.

In Example 31, the subject matter of one or any combination of Examples 16-30 can optionally include wherein the UE is further arranged to transmit an indication of a random access problem to the MeNB.

In Example 32, the subject matter of one or any combination of Examples 16-31 can optionally include wherein the UE uses a MAC control element to transmit the indication.

In Example 33, the subject matter of one or any combination of Examples 16-32 can optionally include wherein the MAC control element has zero bytes.

In Example 34, the subject matter of one or any combination of Examples 16-33 can optionally include wherein the MAC control element includes information indicating: a random access problem in the SeNB, a radio link control error in the SeNB, or a radio link monitoring error in the SeNB.

In Example 35, the subject matter of one or any combination of Examples 16-34 can optionally include wherein the UE uses a Radio Resource Control (RRC) message to indicate the random access problem to the MeNB.

Example 36 includes the subject matter embodied by a method performed by circuitry of a User Equipment (UE) comprising: connecting, at a User Equipment (UE), to a Master evolved Node B (eNB) (MeNB), connecting, at the UE, to a Secondary eNB (SeNB), determining, at the UE, that one of the connections has a Radio Link Failure, determining, at the UE, that the other of the connections remains connected to the UE, and refraining from initiating a Radio Resource Control (RRC) re-establishment procedure while at least one of the connections does not have a Radio Link Failure.

In Example 37, the subject matter of Example 36 can optionally include wherein the connection that has a Radio Link Failure is the MeNB and the connection that remains connected is the SeNB, and wherein the MeNB is associated with a Primary Cell (PCell) and the SeNB is associated with a Secondary Cell (SCell).

In Example 38, the subject matter of one or any combination of Examples 36-37 can optionally include further comprising, receiving, at the UE, a Radio Resource Control reconfiguration message from the MeNB to remove the SCell from a set of cells serving the UE.

In Example 39, the subject matter of one or any combination of Examples 36-38 can optionally include further comprising, transmitting a radio resource control (RRC) message to the MeNB indicating that the SeNB has a Radio Link Failure.

In Example 40, the subject matter of one or any combination of Examples 36-39 can optionally include wherein transmitting the RRC message includes transmitting the RRC message over a logical channel.

In Example 41, the subject matter of one or any combination of Examples 36-40 can optionally include wherein the connection that has a Radio Link Failure is the SeNB and the connection that remains connected is the MeNB, and wherein the MeNB is associated with a Primary Cell (PCell) and the SeNB is associated with a Secondary Cell (SCell).

In Example 42, the subject matter of one or any combination of Examples 36-41 can optionally include further comprising, receiving, at the UE, a Radio Resource Control (RRC) reconfiguration message originating from the MeNB sent through the SeNB.

In Example 43, the subject matter of one or any combination of Examples 36-42 can optionally include further comprising, receiving, at the UE, a handover command message originating from the MeNB through the SeNB.

In Example 44, the subject matter of one or any combination of Examples 36-43 can optionally include further comprising, receiving, at the UE, a handover command message originating from the MeNB through a new cell, wherein the new cell is not the PCell or the SCell.

In Example 45, the subject matter of one or any combination of Examples 36-44 can optionally include further comprising, using a UE context, the UE context maintained by the MeNB.

In Example 46, the subject matter of one or any combination of Examples 36-45 can optionally include further comprising, reconnecting, at the UE, to the MeNB when a MeNB channel condition exceeds a threshold.

In Example 47, the subject matter of one or any combination of Examples 36-46 can optionally include further comprising, monitoring the PCell after determining that the MeNB has a Radio Link Failure.

In Example 48, the subject matter of one or any combination of Examples 36-47 can optionally include further comprising, transmitting a Radio Resource Control (RRC) message to the SeNB indicating that the MeNB has a Radio Link Failure.

In Example 49, the subject matter of one or any combination of Examples 36-48 can optionally include wherein transmitting the RRC message includes transmitting the RRC message over a logical channel.

In Example 50, the subject matter of one or any combination of Examples 36-49 can optionally include further comprising, indicating a Random Access problem to an upper layer.

In Example 51, the subject matter of one or any combination of Examples 36-50 can optionally include further comprising, transmitting an indication of a random access problem to the MeNB.

In Example 52, the subject matter of one or any combination of Examples 36-51 can optionally include wherein transmitting the indication includes transmitting the indication using a MAC control element.

In Example 53, the subject matter of one or any combination of Examples 36-52 can optionally include wherein the MAC control element has zero bytes.

In Example 54, the subject matter of one or any combination of Examples 36-53 can optionally include wherein the MAC control element includes information indicating: a random access problem in the SeNB, a radio link control error in the SeNB, or a radio link monitoring error in the SeNB.

In Example 55, the subject matter of one or any combination of Examples 36-54 can optionally include wherein indicating the random access problem to the MeNB includes using a Radio Resource Control (RRC) message.

In Example 56, the subject matter of one or any combination of Examples 36-55 can optionally include an apparatus comprising means for performing any of the methods of Examples 36-55.

Example 57 includes the subject matter embodied by an apparatus comprising: means for connecting, at a User Equipment (UE), to a Master evolved Node B (MeNB), means for connecting, at the UE, to a Secondary eNB (SeNB), means for determining, at the UE, that one of the connections has a Radio Link Failure, means for determining, at the UE, that the other of the connections remains connected to the UE, and means for refraining from initiating a Radio Resource Control (RRC) re-establishment procedure while at least one of the connections does not have a Radio Link Failure.

In Example 58, the subject matter of one or any combination of Examples 36-55 can optionally include at least one machine-readable medium including instructions for operation of a computer system, which when executed by a machine, cause the machine to perform any of the methods of Examples 36-55.

Example 59 includes the subject matter embodied by at least one machine-readable medium including instructions for operation of a computing system, which when executed by a machine, cause the machine to: connect, at a User Equipment (UE), to a Master evolved Node B (MeNB), connect, at the UE, to a Secondary eNB (SeNB), determine, at the UE, that one of the connections has a Radio Link Failure, determine, at the UE, that the other of the connections does not have a Radio Link Failure, and refrain from initiating a Radio Resource Control (RRC) re-establishment procedure while at least one of the connections does not have a Radio Link Failure.

In Example 60, the subject matter of Example 59 can optionally include wherein the connection that has a Radio Link Failure is the MeNB and the connection that remains connected is the SeNB, and wherein the MeNB is associated with a Primary Cell (PCell) and the SeNB is associated with a Secondary Cell (SCell).

In Example 61, the subject matter of one or any combination of Examples 59-60 can optionally include further comprising operations to receive, at the UE, a Radio Resource Control reconfiguration message from the MeNB to remove the SCell from a set of cells serving the UE.

In Example 62, the subject matter of one or any combination of Examples 59-61 can optionally include further comprising, operations to transmit a radio resource control (RRC) message to the MeNB indicating that the SeNB has a Radio Link Failure.

In Example 63, the subject matter of one or any combination of Examples 59-62 can optionally include wherein to transmit the RRC message includes to transmit the RRC message over a logical channel.

In Example 64, the subject matter of one or any combination of Examples 59-63 can optionally include wherein the connection that has a Radio Link Failure is the SeNB and the connection that remains connected is the MeNB, and wherein the MeNB is associated with a Primary Cell (PCell) and the SeNB is associated with a Secondary Cell (SCell).

In Example 65, the subject matter of one or any combination of Examples 59-64 can optionally include further comprising, operations to receive, at the UE, a Radio Resource Control (RRC) reconfiguration message originating from the MeNB sent through the SeNB.

In Example 66, the subject matter of one or any combination of Examples 59-65 can optionally include further comprising, operations to receive, at the UE, a handover command message originating from the MeNB through the SeNB.

In Example 67, the subject matter of one or any combination of Examples 59-66 can optionally include further comprising, operations to receive, at the UE, a handover command message originating from the MeNB through a new cell, wherein the new cell is not the PCell or the SCell.

In Example 68, the subject matter of one or any combination of Examples 59-67 can optionally include further comprising, operations to use a UE context, the UE context maintained by the MeNB.

In Example 69, the subject matter of one or any combination of Examples 59-68 can optionally include further comprising, operations to reconnect, at the UE, to the MeNB when a MeNB channel condition exceeds a threshold.

In Example 70, the subject matter of one or any combination of Examples 59-69 can optionally include further comprising, operations to monitor the PCell after determining that the MeNB has a Radio Link Failure.

In Example 71, the subject matter of one or any combination of Examples 59-70 can optionally include further comprising, operations to transmit a Radio Resource Control (RRC) message to the SeNB indicating that the MeNB has a Radio Link Failure.

In Example 72, the subject matter of one or any combination of Examples 59-71 can optionally include wherein to transmit the RRC message includes to transmit the RRC message over a logical channel.

In Example 73, the subject matter of one or any combination of Examples 59-72 can optionally include further comprising, operations to indicate a Random Access problem to an upper layer.

In Example 74, the subject matter of one or any combination of Examples 59-73 can optionally include further comprising, operations to transmit an indication of a random access problem to the MeNB.

In Example 75, the subject matter of one or any combination of Examples 59-74 can optionally include wherein to transmit the indication includes to transmit the indication using a MAC control element.

In Example 76, the subject matter of one or any combination of Examples 59-75 can optionally include wherein the MAC control element has zero bytes.

In Example 77, the subject matter of one or any combination of Examples 59-76 can optionally include wherein the MAC control element includes information indicating: a random access problem in the SeNB, a radio link control error in the SeNB, or a radio link monitoring error in the SeNB.

In Example 78, the subject matter of one or any combination of Examples 59-77 can optionally include wherein to indicate the random access problem to the MeNB includes to indicate the random access problem to the MeNB using a Radio Resource Control (RRC) message.

Example 79 includes the subject matter embodied by a method performed by circuitry of a first evolved Node B (eNB) comprising: connecting, at the first eNB, to a User Equipment (UE), wherein the UE is arranged to connect to a second eNB, receiving, at the first eNB, from the UE, an indication of a Radio Link Failure at the second eNB, and suspending at least one radio bearer used by the second eNB.

In Example 80, the subject matter of Example 79 can optionally include wherein the first eNB is a Master eNB (MeNB) and the second eNB is a Secondary eNB (SeNB), and wherein the MeNB is associated with a Primary Cell (PCell) and the SeNB is associated with a Secondary Cell (SCell).

In Example 81, the subject matter of one or any combination of Examples 79-80 can optionally include wherein suspending at least one radio bearer used by the second eNB includes suspending all radio bearers used by SeNB.

In Example 82, the subject matter of one or any combination of Examples 79-81 can optionally include further comprising, transmitting a Radio Resource Control (RRC) reconfiguration message to the UE to remove the SCell.

In Example 83, the subject matter of one or any combination of Examples 79-82 can optionally include wherein the first eNB is a Secondary eNB (SeNB) and the second eNB is a Master eNB (MeNB), and wherein the MeNB is associated with a Primary Cell (PCell) and the SeNB is associated with a Secondary Cell (SCell).

In Example 84, the subject matter of one or any combination of Examples 79-83 can optionally include wherein suspending at least one radio bearer used by the second eNB includes suspending a Signaling Radio Bearer 1 (SRB1) and a Signaling Radio Bearer 2 (SRB2) used by the MeNB.

In Example 85, the subject matter of one or any combination of Examples 79-84 can optionally include further comprising, relaying a Radio Resource Control reconfiguration message from the MeNB to the UE to suspend the at least one radio bearer.

In Example 86, the subject matter of one or any combination of Examples 79-85 can optionally include further comprising, receiving instructions to initiate a handover procedure from the MeNB to suspend the at least one radio bearer.

In Example 87, the subject matter of one or any combination of Examples 79-86 can optionally include further comprising, using a UE context for the UE, the UE context maintained by the MeNB.

In Example 88, the subject matter of one or any combination of Examples 79-87 can optionally include wherein receiving the Radio Link Failure indication includes receiving the Radio Link Failure indication over a logical channel.

In Example 89, the subject matter of one or any combination of Examples 79-88 can optionally include wherein the MeNB is further arranged to receive an indication of a random access problem from the UE.

In Example 90, the subject matter of one or any combination of Examples 79-89 can optionally include wherein MeNB is further arranged to receive the indication using a Radio Resource Control (RRC) message.

In Example 91, the subject matter of one or any combination of Examples 79-90 can optionally include wherein MeNB is further arranged to receive the indication by using a MAC control element.

In Example 92, the subject matter of one or any combination of Examples 79-91 can optionally include wherein the MAC control element has zero bytes.

In Example 93, the subject matter of one or any combination of Examples 79-92 can optionally include wherein the MAC control element includes information indicating: a random access problem in the SeNB, a radio link control error in the SeNB, or a radio link monitoring error in the SeNB.

In Example 94, the subject matter of one or any combination of Examples 79-93 can optionally include an apparatus comprising means for performing any of the methods of claims 79-93.

Example 95 includes the subject matter embodied by an apparatus comprising: means for connecting, at a first evolved Node B (eNB), to a User Equipment (UE), wherein the UE is arranged to connect to a second eNB, means for receiving, at the first eNB, from the UE, an indication of a Radio Link Failure at the second eNB; and means for suspending at least one radio bearer used by the second eNB.

In Example 96, the subject matter of one or any combination of Examples 79-93 can optionally include at least one machine-readable medium including instructions for operation of a computer system, which when executed by a machine, cause the machine to perform any of the methods of claims 79-93.

Example 97 includes the subject matter embodied by at least one machine-readable medium including instructions for operation of a computing system, which when executed by a machine, cause the machine to: connect, at a first evolved Node B (eNB), to a User Equipment (UE), wherein the UE is arranged to connect to a second eNB, receive, at the first eNB, from the UE, an indication of a Radio Link Failure at the second eNB, and suspend at least one radio bearer used by the second eNB.

In Example 98, the subject matter of Example 97 can optionally include wherein the first eNB is a Master eNB (MeNB) and the second eNB is a Secondary eNB (SeNB), and wherein the MeNB is associated with a Primary Cell (PCell) and the SeNB is associated with a Secondary Cell (SCell).

In Example 99, the subject matter of one or any combination of Examples 97-98 can optionally include wherein to suspend the at least one radio bearer used by the second eNB includes to suspend all radio bearers used by SeNB.

In Example 100, the subject matter of one or any combination of Examples 97-99 can optionally include further comprising, operations to transmit a Radio Resource Control (RRC) reconfiguration message to the UE to remove the SCell.

In Example 101, the subject matter of one or any combination of Examples 97-100 can optionally include wherein the first eNB is a Secondary eNB (SeNB) and the second eNB is a Master eNB (MeNB), and wherein the MeNB is associated with a Primary Cell (PCell) and the SeNB is associated with a Secondary Cell (SCell).

In Example 102, the subject matter of one or any combination of Examples 97-101 can optionally include wherein to suspend the at least one radio bearer used by the second eNB includes to suspend a Signaling Radio Bearer 1 (SRB1) and a Signaling Radio Bearer 2 (SRB2) used by the MeNB.

In Example 103, the subject matter of one or any combination of Examples 97-102 can optionally include further comprising, operations to relay a Radio Resource Control reconfiguration message from the MeNB to the UE to suspend the at least one radio bearer.

In Example 104, the subject matter of one or any combination of Examples 97-103 can optionally include further comprising, operations to receive instructions to initiate a handover procedure from the MeNB to suspend the at least one radio bearer.

In Example 105, the subject matter of one or any combination of Examples 97-104 can optionally include further comprising, operations to use a UE context for the UE, the UE context maintained by the MeNB.

In Example 106, the subject matter of one or any combination of Examples 97-105 can optionally include wherein to receive the Radio Link Failure indication includes to receive the Radio Link Failure indication over a logical channel.

In Example 107, the subject matter of one or any combination of Examples 97-106 can optionally include wherein the MeNB is further arranged to receive an indication of a random access problem from the UE.

In Example 108, the subject matter of one or any combination of Examples 97-107 can optionally include wherein MeNB is further arranged to receive the indication using a Radio Resource Control (RRC) message.

In Example 109, the subject matter of one or any combination of Examples 97-108 can optionally include wherein MeNB is further arranged to receive the indication by using a MAC control element.

In Example 110, the subject matter of one or any combination of Examples 97-109 can optionally include wherein the MAC control element has zero bytes.

In Example 111, the subject matter of one or any combination of Examples 97-110 can optionally include wherein the MAC control element includes information indicating: a random access problem in the SeNB, a radio link control error in the SeNB, or a radio link monitoring error in the SeNB.

Example 112 includes the subject matter embodied by User Equipment (UE) adapted for communication with an evolved Node B (eNB), the UE comprising: a transceiver arranged to transmit and receive communication with a Master eNB (MeNB) and a Secondary eNB (SeNB), and a processor, coupled to the transceiver, arranged to perform operations in connection with a connection to a MeNB and a connection to a SeNB: determine that one of a connection to the MeNB and a connection to the SeNB has a Radio Link Failure, determine that the other one of the connection to the MeNB and the connection to the SeNB does not have a Radio Link Failure, and communicate to the one of the connection to the MeNB and the connection to the SeNB to suspend at least one radio bearer used by the one of the connection to the MeNB and the connection to the SeNB via the other one of the connection to the MeNB and the connection to the SeNB.

In Example 113, the subject matter of Example 112 can optionally include wherein the one of the connection to the MeNB and the connection to the SeNB that has the Radio Link Failure is the connection to the MeNB and the other one of the connection to the MeNB and the connection to the SeNB that does not have the Radio Link Failure is the connection to the SeNB, and wherein the MeNB is associated with a Primary Cell (PCell) and the SeNB is associated with a Secondary Cell (SCell).

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A first evolved Node B (eNB), the first eNB connected to a User Equipment (UE), the first eNB comprising:
   hardware processing circuitry arranged to:
      receive, from the UE, an indication of a Radio Link Failure at a second eNB, the UE in a dual connectivity state with the first eNB and the second eNB, wherein the indication indicates that the UE is to refrain from initiating a Radio Resource Control (RRC) re-establishment procedure between the UE and the second eNB; and
      communicate to the second eNB a command to suspend at least one radio bearer, the at least one radio bearer used prior to being suspended by the second eNB to communicate with the UE.

2. The first eNB of claim 1, wherein the first eNB is a Master eNB (MeNB) and the second eNB is a Secondary eNB (SeNB), and wherein the MeNB is associated with a Primary Cell (PCell) and the SeNB is associated with a Secondary Cell (SCell).

3. The first eNB of claim 2, wherein operations to suspend the at least one radio bearer used by the second eNB include operations to suspend all radio bearers used by the SeNB.

4. The first eNB of claim 2, wherein the hardware processing circuitry of the MeNB is further arranged to transmit a Radio Resource Control reconfiguration message to the UE to remove the SCell from a set of cells serving the UE.

5. The first eNB of claim 1, wherein the first eNB is a Secondary eNB (SeNB) and the second eNB is a Master eNB (MeNB), and wherein the MeNB is associated with a Primary Cell (PCell) and the SeNB is associated with a Secondary Cell (SCell).

6. The first eNB of claim 5, wherein operations to suspend at least one radio bearer used by the second eNB include operations to suspend a Signaling Radio Bearer 1 (SRB1) and a Signaling Radio Bearer 2 (SRB2) used by the MeNB.

7. The first eNB of claim 5, wherein the hardware processing circuitry of the SeNB is further arranged to relay a Radio Resource Control reconfiguration message from the MeNB to the UE to suspend the at, least one radio bearer.

8. The first eNB of claim 5, wherein the hardware processing circuitry of the SeNB is further arranged to receive instructions to initiate a handover from the MeNB to suspend the at least one radio bearer.

9. The first eNB of claim 5, wherein the hardware processing circuitry of the SeNB is further arranged to use a UE context for the UE, the UE context maintained by the MeNB.

10. The first eNB of claim 5, wherein the hardware processing circuitry of the SeNB is further arranged to receive the Radio Link Failure indication over a logical channel.

11. The first eNB of claim 5, wherein the MeNB is further arranged to receive an indication of a random access problem from the UE.

12. The first eNB of claim 11, wherein the indication is received by the MeNB using a Radio Resource Control (RRC) message.

13. The first eNB of claim 11, wherein the indication is received by the MeNB using a MAC control element, and wherein the MAC control element has zero bytes or the MAC control element includes information indicating:
a random access problem in the SeNB, a radio link control error in the SeNB, or a radio link monitoring error in the SeNB.

14. User Equipment (UE) adapted for communication with an evolved Node B (eNB), the UE comprising:
a transceiver arranged to transmit and receive communication with a Master eNB (MeNB) and a Secondary eNB (SeNB) in a dual connectivity state; and
a processor, coupled to the transceiver, arranged to:
determine that one of a connection to the MeNB and a connection SeNB has a Radio Link Failure;
determine that the other one of the connection to the MeNB and the connection to the SeNB does not have a Radio Link Failure; and
prevent initiation, by the UE, of a Radio Resource Control (RRC) re-establishment procedure between the UE and the one of the connection to the MeNB and the connection to the SeNB that has the Radio Link Failure while the other one of the connection to the MeNB and the connection to the SeNB does not have a Radio Link Failure and remains connected to the UE.

15. The UE of claim 14, wherein the connection that has a Radio Link Failure is the MeNB and the connection that remains connected is the SeNB, and wherein the MeNB is associated with a Primary Cell (PCell) and the SeNB is associated with a Secondary Cell (SCell), and wherein the UE is further arranged to transmit a Radio Resource Control (RRC) message to the MeNB indicating that the SeNB has a Radio Link Failure.

16. The UE of claim 14, wherein the connection that has a Radio Link Failure is the SeNB and the connection that remains connected is the MeNB, and wherein the MeNB is associated with a Primary Cell (PCell) and the SeNB is associated with a Secondary Cell (SCell).

17. The UE of claim 16, wherein the UE is further arranged to receive a Radio Resource Control reconfiguration message originating from the MeNB sent through the SeNB.

18. The UE of claim 16, wherein the UE is further arranged to receive a handover command message originating from the MeNB through the SeNB.

19. The UE of claim 16, wherein the UE is further arranged to receive a handover command message originating from the MeNB through a new cell, wherein the new cell is not the PCell or the SCell.

20. The UE of claim 16, wherein the UE is further arranged to reconnect to the MeNB when a MeNB channel condition exceeds a threshold.

21. At least one non-transitory machine-readable medium including instructions for operation of a computing system, which when executed by a machine, cause the machine to:
connect, at a User Equipment (UE), to a Master evolved Node B (MeNB);
connect, at the UE, to a Secondary eNB (SeNB), in a dual connectivity state;
determine, at the UE, that one of the connections has a Radio Link Failure;
determine, at the UE, that the other of the connections does not have a Radio Link Failure; and
refrain, at the UE, from initiating a Radio Resource Control (RRC) re-establishment procedure between the UE and the one of the connections that has the Radio Link Failure while the other of the connections does not have a Radio Link Failure and remains connected to the UE.

22. The at least one machine-readable medium of claim 21, wherein the connection that has a Radio Link Failure is the SeNB and the connection that remains connected is the MeNB, and wherein the MeNB is associated with a Primary Cell (PCell) and the SeNB is associated with a Secondary Cell (SCell).

23. The at least one machine-readable medium of claim 22, further comprising, operations to receive, at the UE, a Radio Resource Control (RRC) reconfiguration message originating from the MeNB sent through the SeNB.

24. User Equipment (UE) adapted for communication with an evolved Node B (eNB), the UE comprising:
a transceiver arranged o transmit and receive communication with a Master eNB (MeNB) and a Secondary eNB (SeNB), in a dual connectivity state; and
a processor, coupled to the transceiver, arranged to perform operations in connection with a connection to a .MeNB and a connection. to a SeNB:
determine that one of a connection to the MeNB and a connection to the SeNB has a Radio Link Failure;
determine that the other one of the connection to the MeNB and the connection to the SeNB does not have a Radio Link Failure; and
communicate indirectly to the one of the connection to the MeNB and the connection to the SeNB to suspend at least one radio bearer used by the one of the connection to the MeNB and the connection to the SeNB, the at least one radio bearer used to communicate with the UE by the one of the connection to the MeNB and the connection to the SeNB prior to being suspended, wherein to communicate includes to communicate via the other one of the connection to the MeNB and the connection to the SeNB that does not have a Radio Link Failure and remains connected to the UE.

25. The UE of claim 24, wherein the one of the connection to the MeNB and the connection to the SeNB that has the Radio Link Failure is the connection to the MeNB and the other one of the connection to the MeNB and the connection to the SeNB that does not have the Radio Link Failure is the connection to the SeNB, and wherein the MeNB is associated with a Primary Cell (PCell) and the SeNB is associated with a Secondary Cell (SCell).

* * * * *

UNITED STATES PATENT AND TRADEMARK OFFICE
CERTIFICATE OF CORRECTION

PATENT NO. : 9,674,852 B2  
APPLICATION NO. : 14/491639  
DATED : June 6, 2017  
INVENTOR(S) : Heo et al.

Page 1 of 1

It is certified that error appears in the above-identified patent and that said Letters Patent is hereby corrected as shown below:

On the Title Page

On page 3, in Column 1, item (56), under "FOREIGN PATENT DOCUMENTS", Line 9, delete "WO-201310808 A1" and insert --WO-2013108048 A1-- therefor On page 4, in Column 2, item (56), under "Other Publications", Line 26, delete "mailedMar." and insert --mailed Mar.-- therefor In the Claims In Column 20, Line 59, in Claim 7, delete "at," and insert --at-- therefor In Column 21, Line 25, in Claim 14, after "connection", insert --to the--

In Column 22, Line 32, in Claim 24, delete "o" and insert --to-- therefor

In Column 22, Line 37, in Claim 24, delete ".MeNB" and insert --MeNB-- therefor

In Column 22, Line 37, in Claim 24, delete "connection." and insert --connection-- therefor Signed and Sealed this  
Twenty-eighth Day of May, 2019

Andrei Iancu  
*Director of the United States Patent and Trademark Office*